Sept. 3, 1968 P. J. WOOD 3,399,804

ARTICLE CARRIER

Filed June 17, 1966 6 Sheets-Sheet 1

INVENTOR.
PRENTICE J. WOOD
BY Walter M. Rodgers
ATTORNEY

INVENTOR.
PRENTICE J. WOOD
BY Walter M. Rodgers
ATTORNEY

Sept. 3, 1968 P. J. WOOD 3,399,804

ARTICLE CARRIER

Filed June 17, 1966 6 Sheets-Sheet 3

INVENTOR.
PRENTICE J. WOOD

BY Walter M. Rodgers

ATTORNEY

INVENTOR.
PRENTICE J. WOOD
BY Walter M. Rodgers
ATTORNEY

ARTICLE CARRIER

Filed June 17, 1966 6 Sheets-Sheet 5

*INVENTOR.*
PRENTICE J. WOOD
BY *Walter M. Rodgers*
ATTORNEY

ARTICLE CARRIER

Filed June 17, 1966 6 Sheets-Sheet 6

INVENTOR.
PRENTICE J. WOOD
BY Walter M. Rodgers
ATTORNEY

United States Patent Office 3,399,804

Patented Sept. 3, 1968

3,399,804

ARTICLE CARRIER

Prentice J. Wood, Jonesboro, Ga., assignor to The Mead Corporation, a corporation of Ohio Filed June 17, 1966, Ser. No. 558,409

10 Claims. (Cl. 220—118)

ABSTRACT OF THE DISCLOSURE

A combination plastic and paperboard article carrier is disclosed wherein a plastic loadbearing base is detachably secured to an upright plastic handle having a hand gripping aperture and two downwardly extending prongs which are disjointably secured to the base. The walls and partitions of the carrier are formed of renewable paperboard and the end and side walls coincide generally with the outer edge portions of the base and the medial partition formed of paperboard is disposed about and envelopes at least a part of the plastic handle. Transverse partition strips of paperboard extend between the side walls and the medial partition structure to divide the parts of the carrier on either side of the handle into a plurality of article receiving cells. According to one modification, the plastic handle and its hand gripping aperture extend above the medial paperboard partition structure while in another modification of the invention, the plastic handle is completely surrounded by the medial partition structure of paperboard and the apertures therein are disposed in coincidental relationship to the aperture formed in the plastic handle.

Figure 1:
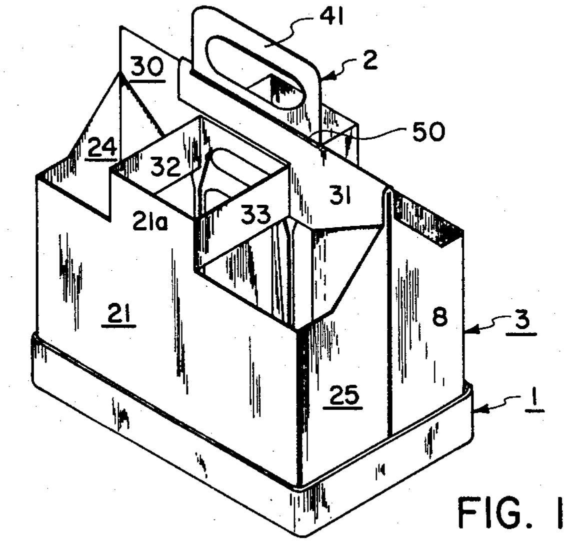

This invention relates to article carriers and more particularly to a type of carrier wherein a relatively strong and durable material is utilized for the structural load bearing elements and wherein flexible renewable elements are utilized for advertising components and for article separation and retention. More specifically in one form the invention comprises relatively rigid plastic elements together with renewable elements of paperboard.

Article carriers constructed of paperboard are well known. Such carriers ordinarily are made from one or more blanks of material and are collapsible in most instances. Of course, such carriers perform the function of supporting the weight of the articles and at the same time provide separation and retention of the articles as well as advertising space. Carriers of this type are returnable by the user of the end product and are ordinarily reloaded and used again to transport the articles for several trips between the point of purchase and the point of use by the consumer. Of course, the durability of carriers of this type is impaired where high humidity conditions exist or where for some reason unusually rough treatment is afforded the carriers.

Article carriers constructed of relatively durable material such as metal or plastic are also known. Carriers of this type are virtually immune to high humidity conditions and of course are capable of withstanding a substantial amount of physical abuse due to rough usage. While carriers of the all-plastic type are relatively durable, such devices afford a minimum of advertising space and are generally inadequate from the standpoint of appearance.

Plastic carriers are more costly initially than carriers of paperboard. While such carriers are more durable than paperboard carriers they are objectionable because they frequently become scratched or scuffed and of course cannot be refurbished. Furthermore, the printed indica on plastic carriers cannot be changed. Plastic carriers also are objectionable because of their considerable space requirements. When plastic carriers are used over a substantial period of time they frequently accumulate dirt and require washing which operation is expensive and time consuming.

A principal object of this invention is to provide an improved article carrier wherein structural strength and mechanical durability are inherent in the carrier particularly insofar as the stress bearing members are concerned and wherein the advantages of renewable and attractive advertising panels are utilized in a single carrier.

Another object of the invention is the provision of an improved carrier which affords maximum durability and which also is renewable insofar as appearance and advertising are concerned in the plant of a primary user such as a bottler.

Still another object of the invention is to provide an improved carrier which may be transported from the plant of the manufacturer to the plant of the primary user such as a bottler in collapsed condition and which may readily be formed into set-up condition at the plant of the bottler, the carrier being adapted for easy disassembly to facilitate storage if desired.

A further object of the invention is the provision of an improved carrier which is sufficiently sturdy to afford a feeling of security to the user when grasped and carried.

A still further object of this invention is to provide an improved carrier which is less costly than plastic carriers and which incorporates the best features of both paperboard and plastic.

The invention in one form as applied to an article carrier comprises a rigid base, a rigid handle disjointably secured to said base, spaced side and end walls of yieldable material interconnected with each other at their ends to form a rectangular structure disposed in general coincidence with the outer edges of said base, and a multi-panelled medial partition of the same material from which the side and end walls are constructed and which is interconnected at its ends with the carrier end walls medially thereof, and wherein portions of the panels of said multi-panelled partition are secured in face contacting relation while other adjacent areas thereof are free of each other to define a cavity for removably receiving at least a part of the rigid handle.

In accordance with one version invention the multi-panelled partition is provided with an opening along its topmost edge so as to allow at least a portion of the rigid handle to project therethrough. In accordance with another modification of the invention the entire rigid handle structure is encased within the confines of the multi-panelled partition and apertures provided in both the rigid handle and in the multi-panelled partition are arranged in coincidence with each other for affording a hand gripping opening. In accordance with a feature of the invention, the rigid handle is disjointably connected with the rigid base, such parts being specially constructed so as to facilitate connection and disconnection of these elements. Preferably the base is provided with a peripheral rim and transverse struts. Slots are formed between the ends of the struts and the base rim to receive the bottom edges of the carton sidewalls. Also means such as a plurality of V-shaped slots are provided along the bottom edges of the side and end walls so as to align and hold the walls in proper relationship to the base. In accordance with still another feature of the invention, a securing flap is struck out of at least one panel of the multi-panelled partition and foldably joined thereto along a fold line, the flap being foldable through the hand gripping aperture in the rigid handle to aid in holding the handle together in fixed but removable relation. According to a further feature of the invention, an abutment ledge may be formed on the rigid handle and arranged to engage an edge of at least one panel of the multi-panelled partition thereby to aid in preventing inadvertent disassembly of the two basic components of the carrier.

Figure 2:
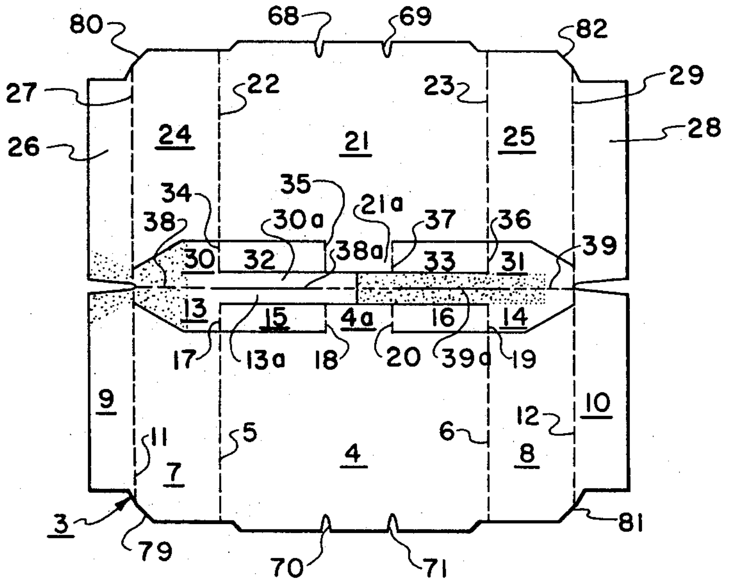
Figure 3:
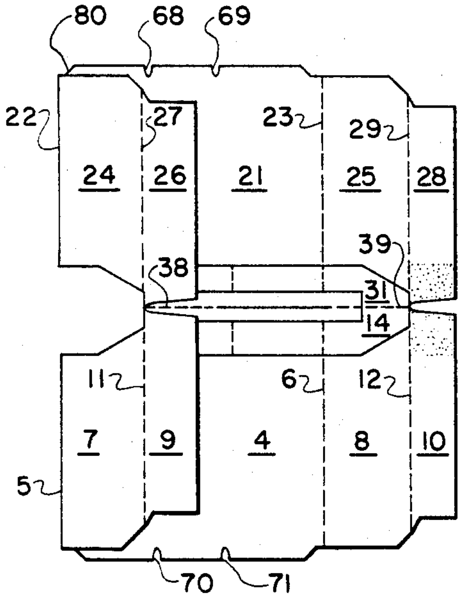
Figure 4:
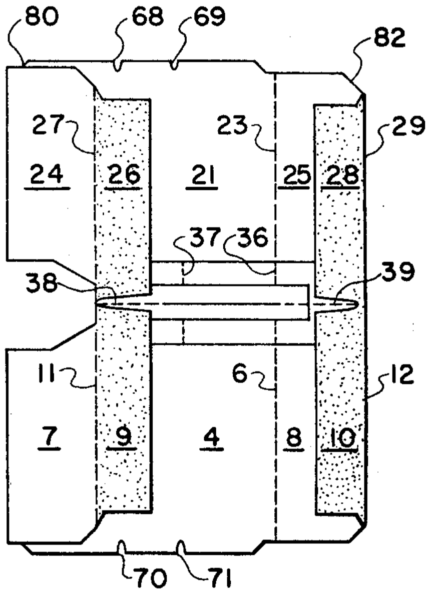
Figure 5:
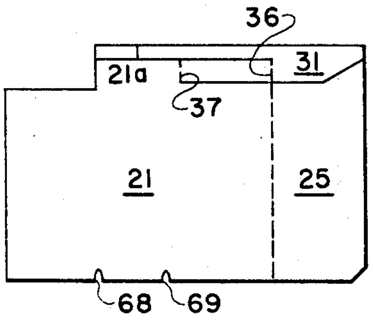
Figure 6:
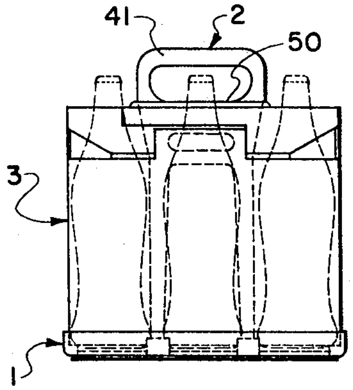
Figures 7A, 7B, 7C, 8:
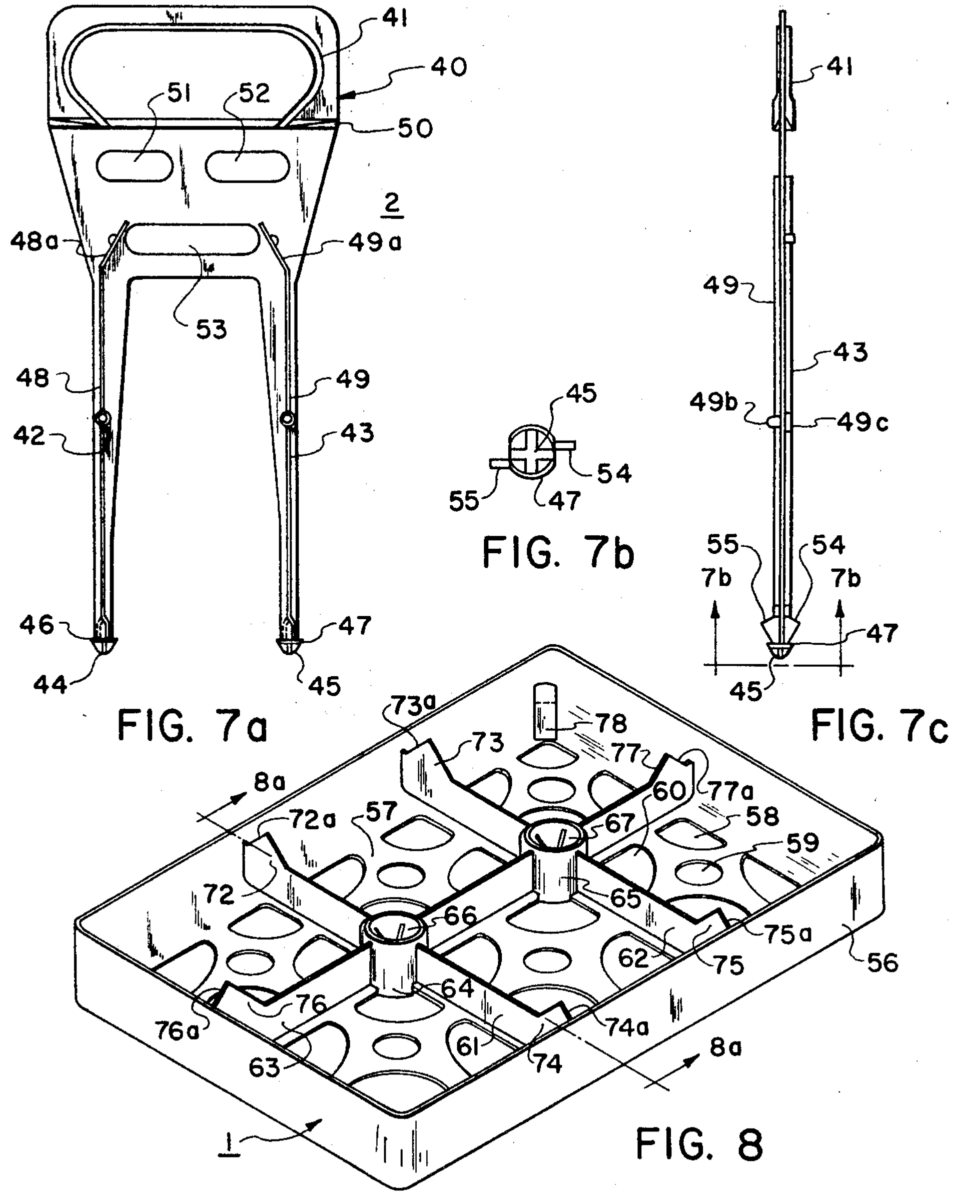
Figure 8A:
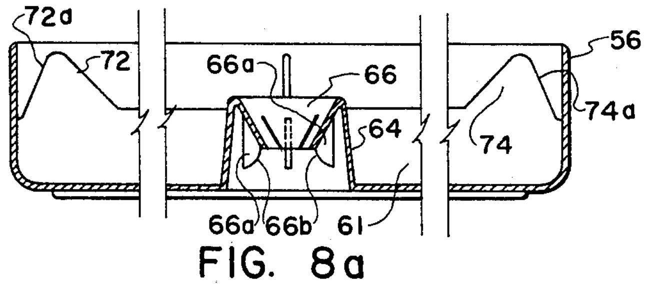
Figure 9:
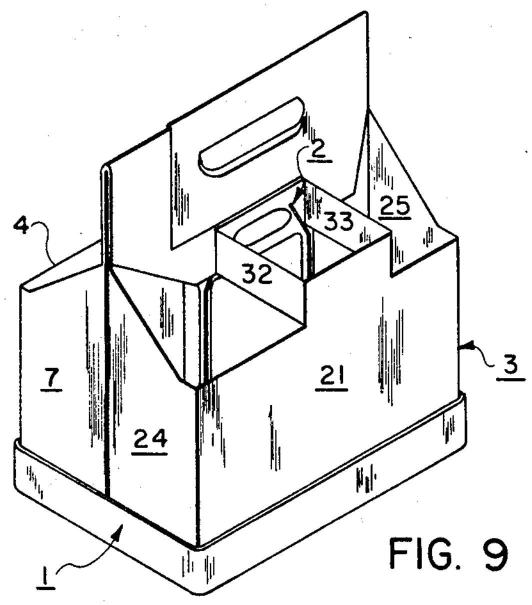
Figure 10:
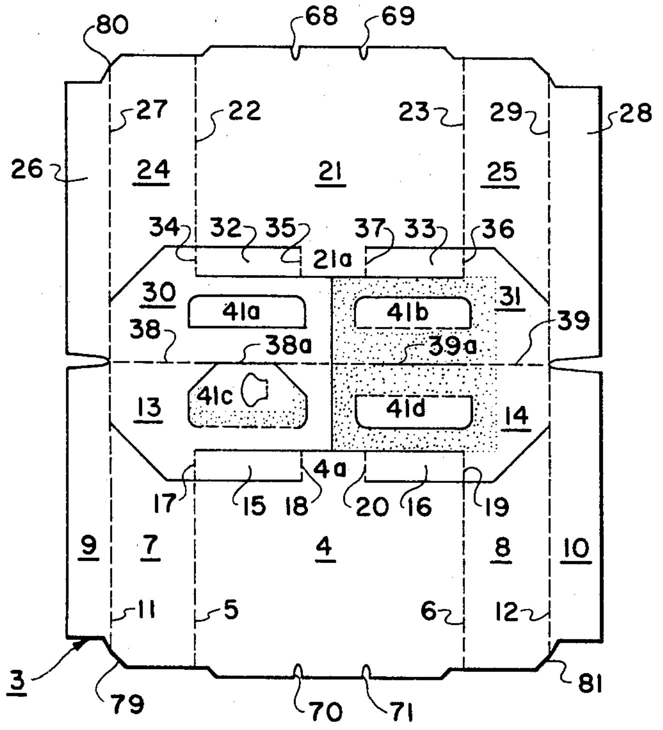
Figure 11:
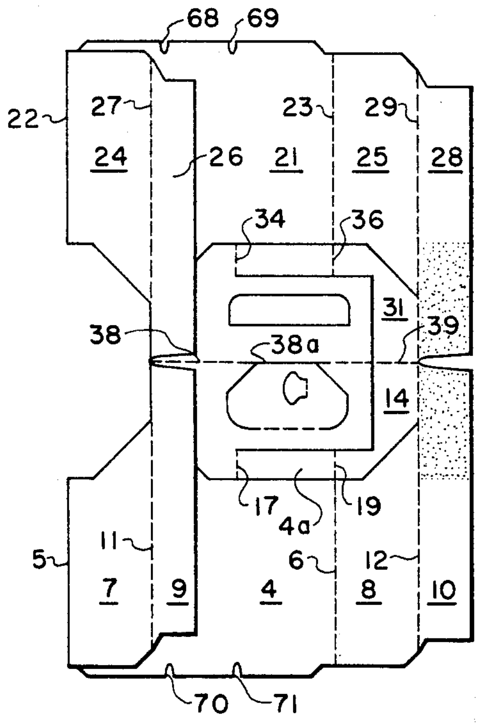
Figure 12:
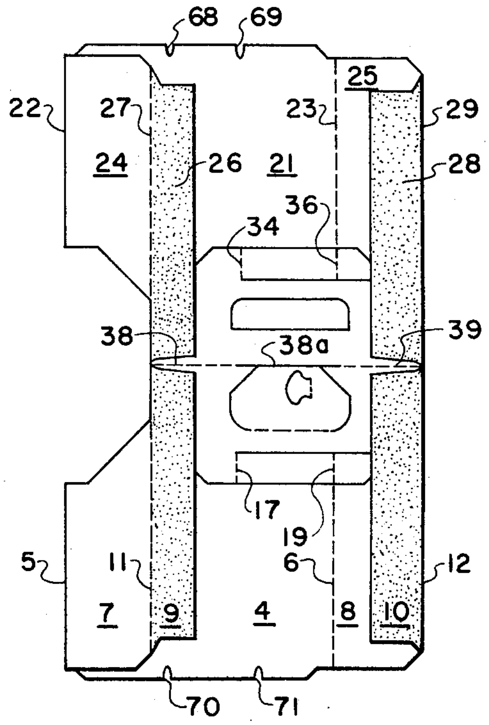
Figure 13:
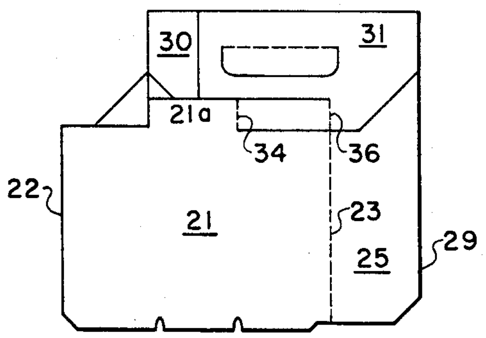
Figure 14:
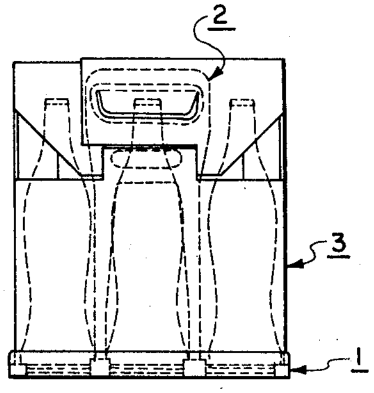
Figure 15A:
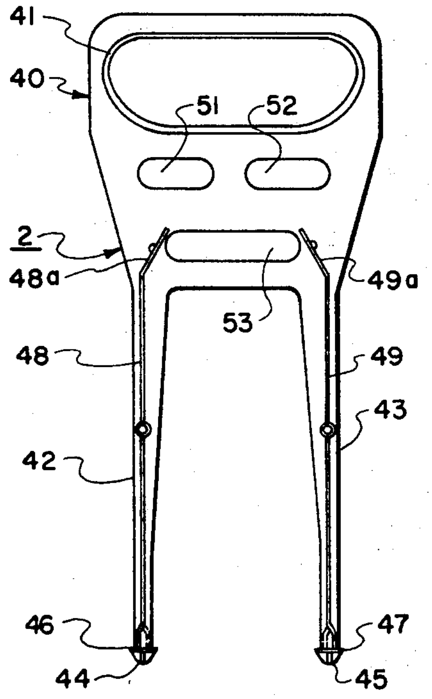
Figure 15B:
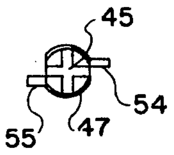
Figure 15C:
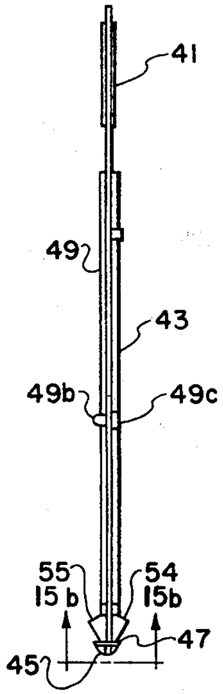
Figure 16:
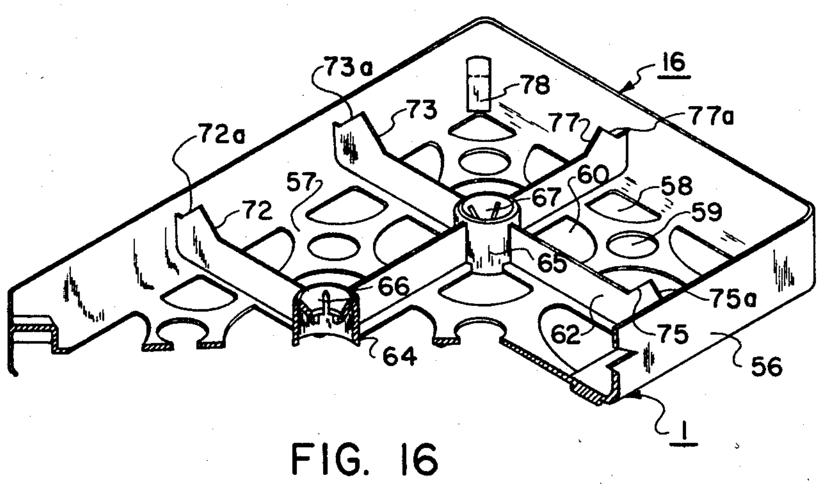

For a better understanding of the invention reference may be had to the following detailed description taken in conjunction with the accompanying drawings wherein FIG. 1 is a perspective view of one form of the invention showing the completed carrier in set-up condition; FIG. 2 is a plan view of the blank used as a principal component of the carrier depicted in FIG. 1; FIGS. 3, 4 and 5 represent successive stages through which the blank of FIG. 2 manipulated to form the collapsed paperboard portion of the carrier as depicted in completed form in FIG. 5; FIG. 6 is a side view of the carrier depicted in FIG. 5 and showing the carrier in set-up conditions; FIGS. 7*a*, 7*b* and 7*c* are side, detail, and end views of the rigid handle portion of the carrier; FIG. 8 is a perspective view of the base portion of the carrier which cooperates with the handle portion depicted in FIG. 7 and which together with the handle and body portions form the completed carrier as depicted in FIGS. 1 and 6; FIG. 8*a* is a cross-sectional view taken on line 8*a*—8*a* in FIG. 8; FIG. 9 is a view similar to FIG. 1 and representing a modification of the invention wherein the rigid handle does not protrude through the top edge of the multi-panelled paperboard handle; FIG. 10 is a plan view of the paperboard blank incorporated in the carrier depicted in FIG. 9; FIGS. 11, 12 and 13 depict stages through which the blank of FIG. 10 is manipulated to form collapsed paperboard structure shown in FIG. 13; FIG. 14 is a side view of a set-up carrier using the collapsed carrier of FIG. 13 and which represents the carrier of FIG. 9 from side; is a side view of the handle structure of the carrier depicted in FIGS. 9 and 14; FIG. 15*b* is a view taken along the line designated 15*b*—15*b* in FIGS. 15*c*; FIG. 15*c* is a side view of the handle depicted in FIG. 15*a* and in which FIG. 16 is a cutaway perspective view of the base portion of the carrier depicted in FIGS 9 and 14.

With reference to the drawings, the numeral 1 generally designates a rigid base constructed preferably of plastic. The numeral 2 generally designates a rigid handle which is disjointably secured to the base 1 and the numeral 3 generally designates the yieldable part of the carrier as depicted in FIG. 1 and which is represented by the blank designated as FIG. 2. The handle and base are shown in separated condition in FIGS. 7 and 8 respectively. The handle and base when assembled constitute the load bearing structure.

The blank 3 depicted in FIG. 2 is of the general type disclosed and claimed in U.S. Patent 2,537,452. The paper portion of the carrier designated generally by the numeral 3 comprises a side wall 4 having end edges 5 and 6. An end panel 7 is foldably joined to one end of side wall 4 along fold line 5 while a similar end panel 8 is foldably joined to the other end of side wall 4 along fold line 6. Riser panels 9 and 10 are foldably joined to the edges of end panels 7 and 8 identified by the numerals 11 and 12 respectively.

Partition panels 13 and 14 are foldably joined to the riser panels 9 and 10 along the fold lines 11 and 12 respectively.

For the purpose of forming article receiving cells along one side of the handle of the carrier, partition strips 15 and 16 are provided. Partition strip 15 is foldably joined to partition panel 13 along fold line 17 and to the high center portion 4*a* of side wall 4 along fold line 18. Partition strip 16 is foldably joined to handle panel 14 at the one end along a fold line 19 and at the other end to the high center portion 4A of side wall 4 along a fold line 20.

The other side of the carrier is of similar construction and comprises a side wall 21 having end edges 22 and 23. An end panel 24 is foldably joined to one end 22 of side wall 21 while a similar end panel 25 is foldably joined to the other end 23 of side wall 21. Riser panel 26 is foldably joined to one edge 27 of end panel 24 while a similar riser panel 28 is foldably joined to an edge 29 of end panel 25.

Partition panel 30 is foldably joined to riser panel 26 along fold line 27 and a similar panel 31 is foldably joined to riser panel 28 along fold line 29.

Forming article receiving cells on the side of the handle adjacent to side wall 21, a pair of partitioning strips 32 and 33 are provided. Partitioning strip 32 is foldably joined to partition panel 30 along fold line 34 and to the high center portion 21A of side wall 21 along a fold line 35. Similarly one end of partition strip 33 is foldably joined to panel 31 along fold line 36 while the other end of strip 33 is foldably joined to the high center portion 21A of side wall 21 along fold line 37.

In order to manipulate the blank depicted in FIG. 2 into the collapsed finished form depicted in FIG. 5 three folding operations are effected. An application of glue may be applied to the blank as depicted in FIG. 2 and as represented by the stippled areas. In order to manipulate the carrier into the condition depicted in FIG.3, riser panels 26 and 9 are folded forwardly and toward the right along the fold lines 27 and 11 so as to cause the stippled areas thereof to become secured to the stippled areas of panels 30 and 13 respectively. Simultaneously end panels 24 and 7 are swung upwardly and toward the right along the fold lines 22 and 5 respectively. This operation elevates the panels 30 and 13 and swings those panels into flat face contacting relation with the panels 31 and 14. The blank then appears as depicted in FIG. 3.

An application of glue is then made to the blank as depicted in FIG. 3 and as represented by the stippled areas. Following this application of glue, the riser panels 28 and 10 are swung forwardly and toward the left along the fold lines 29 and 12 respectively to occupy positions as depicted in FIG. 4. Of course this operation causes the strippled areas of riser panels 28 and 10 to become affixed to the inner surfaces of the handle panels 31 and 14 respectively.

Following this operation an application of glue is made as indicated by the stippled areas in FIG. 4. The side wall 21, end panels 24, 25, riser panels 26 and 28 as well as partition panels 30 and 31 are folded upwardly and forwardly and into face contacting relation with the corresponding parts associated with the side wall 4. This folding operation is along the medial fold line 38 by which panels 30 and 13 are foldably interconnected and along the fold line 39 by which the panels 31 and 14 are foldably interconnected. This operation causes the riser panel 26 to adhere to the riser panel 9 and also causes the riser panel 28 to adhere to the riser panel 10. The paperboard portion of the carton then appears in collapsed form as depicted in FIG. 5.

The glueing operations described above are not vital to the invention, although the glueing operations facilitate formation of the carrier as well as shipment and handling thereof.

The rigid handle 2 as depicted in FIG. 7 comprises a handle portion generally designated at 40 in which a hand gripping aperture 41 is formed and a pair of prongs or legs 42 and 43. Prongs 42 and 43 are provided at their lower ends with rounded nose portions 44 and 45 and with fastening ledges 46 and 47 respectively. Prongs 42 and 43 are also provided with bracing ribs 48 and 49 respectively for enhancing the strength and rigidity of the prongs.

For the purpose of engaging a panel of the multi-panelled paperboard partition structure, an abutment ledge 50 is formed integrally with the handle structure 40. Of course the spacing of ledge 50 above the base 1 must correspond with height of the fold lines 38 and 39 above the bottom edges of the walls 4 and 21.

In order to effect a saving of material where structural strength is more than adequate, a plurality of apertures 51, 52 and 53 may be formed in handle portion 40 of the handle 2 if desired.

For the purpose of aiding in guiding the handle 2 into its proper position within the paperboard portion 3 of the carrier, the bracing ribs 48 and 49 are bevelled inwardly as designated at 48*a* and 49*a* respectively.

In order to arrest the movement of prongs 42 and 43 into their cooperating sockets, the lower ends of the prongs 42 and 43 are flared outwardly as is designated by the tabs 54 and 55. As is best shown in FIG. 7*b*, the tabs 54 and 55 are offset from each other by curving the ribs 48 and 49 as is shown best in FIG. 7*a*. This feature facilitates stacking of one handle atop another and effects a saving of space.

Recesses 49C of one prong of one handle are arranged to receive the protrustions 49*b* of a corresponding prong of another handle when the carton is disassembled so as to facilitate stacking of the prongs.

The base generally designated by the numeral 1 incorporates a rim portion 56 which is integrally formed with the generally flat base portion 57. As clearly shown in FIG. 8, base portion 57 is provided with a plurality of apertures such as are designated at 58, 59, 60 and the like. It will be understood that the apertures such as 58–60 inclusive can be of any desired configuration so long as the strength of the base portion 57 is not impaired.

In order to reinforce the base 1 and for the purpose of dividing the base 1 into a plurality of article receiving cells, a pair of transverse struts 61 and 62 are formed integrally with the base 1 together with a medial strut 63.

For receiving the rounded nose portions 44 and 45 of the prongs 42 and 43, a pair of sockets 64 and 65 are formed at the intersections of the medial strut 63 and the transverse struts 61 and 62 respectively.

For cooperating with the fastening ledges 46 and 47 of the prongs 42 and 43 respectively, a plurality of semi-rigid fingers 66 and 67 are formed integrally with the sockets 64 and 65. These fingers 66 and 67 taper inwardly and downwardly so that once the ledges 46 and 47 are forced downwardly below the lower edges of the fingers 66 and 67, a secure gripping action is effected. The structure of socket 64 is shown in considerable detail in FIG. 16, the base 1 of FIG. 16 being identical to the base 1 as depicted in FIG. 8.

The lower ends of prongs 42 and 43 may be disconnected from sockets 64 and 65 by simply forcing the fingers 66 and 67 radially outward. To this end, tabs such as 66*a* shown in FIG. 8*a* are provided. A rounded nose tool is pushed upwardly and engages the rounded portion 66*b* to force the fingers 66 outwardly.

In order to cause the sides and ends of the paper structure 3 to coincide with the edges of the base 1, a pair of notches 68 and 69 are formed at the bottom edge of side wall 21 and such notches receive the right hand end of the struts 61 and 62 as depicted in FIG. 8. Similarly notches 70 and 71 receive the left hand ends of struts 61 and 62.

For the purpose of facilitating alignment of the paperboard body portion 3 with the base portion 1, the ends of the transverse struts 61 and 62 are provided with upwardly extending protrusions 72–75 which are provided with downwardly inclined surfaces as designated by the numerals 72*a*, 73*a*, 74*a* and 75*a*.

In like fashion protrusions 76 and 77 are formed at the ends of medial strut 63 and are provided with downwardly inclined surfaces 76*a* and 77*a*.

Since the upper handle portion 41 of the rigid handle 2 protrudes upwardly through the top edge of the medial partition of the paperboard portion 3 of the carrier, an opening is formed by coinciding slits along the top edge. Such slits are best shown in FIG. 2 and are identified by the numerals 38*a* and 39*a*. Of course when the carrier handle is formed into completed form as depicted in FIG. 5, slots 38*a* and 39*a* coincide with each other.

In order to provide a cavity into which the handle part 41 of rigid handle 2 may slide without impediment, the inner portions 30*a* and 13*a* of panels 30 and 13 respectively are left without an application of glue. In view of this the handle part 41 of rigid handle 2 may freely slide between the panels 30 and 13 to occupy the assembled position depicted in FIGS. 1 and 6.

In order to set-up the paper portion of the carrier it is simply necessary to apply a force to the left along the right hand edge of the carrier as shown in FIG. 5 while holding the carrier against bodily movement toward the left.

As an aid in preventing dislodgement of the handle 2 downwardly through the paperboard portion 3 of the carrier, the ledge 50 is arranged to overlie the top edge of the handle panels 30, 13, 31 and 14 or at the slits 38*a* and 39*a* as is best shown in FIG. 6. As explained, the dimensional relationship of the parts is such that the paper portion of the carrier is held down against the base.

As an additional stabilizing element, tabs 78 are formed at the corners of base 1 and serve to support the adjacent portion of the paperboard structure 3.

The cutaway corners 79 and 80 on the paperboard blank define a notch which slides along the inclined surface 76*a* while the cutaway corners 81 and 82 of end panels 8 and 25 define a notch which cooperates with inclined edge 77*a*.

In order to assemble the carrier, the prongs 42 and 43 are placed above the sockets 64 and 65 and the rounded nose portions 44 and 45 are forced through the semi-rigid fingers 66 and 67 until the fastening ledges 46 and 47 are secured below the lower edges of the fingers 66 and 67. Thereafter the paperboard portion of the carrier as depicted in collapsed form in FIG. 5 is moved into its set-up condition to form the completed carrier as depicted in FIGS. 1 and 6, and the handle 41 is inserted into the space between the panels 30 and 13 to occupy the position depicted in FIGS. 1 and 6. This operation of course causes the notches 68 and 69 to slide along the inclined surfaces 74*a* and 75*a* while the notches 70 and 71 ride along the inclined edges 72*a* and 73*a* respectively. When the assembly operation is completed the abutment ledge 50 overlies the top of the handle immediately above the slots 38*a* and 39*a*.

The carrier described thus far and has as shown in FIGS. 1–8 inclusive includes sturdy weight carrying handle element 2 and base element 1 which constitute durable load bearing portions, together with the renewable advertising portions which are designated by the numeral 3 and which also constitute bottle separating and retention elements of the carrier. It is obvious that the element 3 of the carrier is renewable and that the elements 1 and 2 may be used over and over again as the parts 3 are replaced from time to time. Furthermore portion 3 may be removed in order to substitute different identifying marking for the carrier. Baseboard or rim 56 tends to prevent scuffing of the paper side and end walls.

The modification of the invention as depicted in FIGS. 9–14 inclusive is similar to that depicted in FIGS. 1–8 inclusive and corresponding parts are identified with the same reference numerals in both forms of the invention. The essential difference between the two versions of the invention centers around the fact that in the arrangement of FIGS. 1–8 inclusive, the hand gripping portion 41 of the rigid handle 2 protrudes upwardly beyond the upper edge of the multi-panelled partition portion of the paperboard part 3 of the carrier whereas in the modification depicted in FIGS. 9–14 the upper portion of the rigid handle 2 is captured entirely within the multi-panelled partition formed by the paperboard medial panels with apertures in the two elements being in coincidence. In FIG. 10 the flaps 41*a*, 41*b*, 41*c* and 41*d* define hand gripping openings and panel 41*c* serves as a medial bracing and separating panel as is well known. Preferably one or more of the flaps 41*a*, 41*b* and 41*d* are foldable through the aperture 41 in handle 40 and aid in holding the handle 40 and the partitions 13, 14, 30, 31 together in a fixed but removable relation. Thus as is clearly evident in FIGS. 9 and 14, the hand gripping portion 41 of the rigid handle 2 is not visible. This essential difference results in the elimination of the abutment ledge 50 from the rigid handle 2 as depicted for example in FIG. 15. Of course the particular shape of the panels 30, 31, 13 and 14 is slightly different in the two versions but otherwise there is no structural difference of significance.

Since the arrangement depicted in FIGS. 1–8 inclusive is structurally similar to that represented in FIGS. 9–14, the steps in the assembly of the paperboard and plastic elements are the same. Thus a detailed description of the formation of the arrangement depicted in FIGS. 9–14 is not deemed necessary.

While particular embodiments of the invention have been shown and described, the invention is not limited thereto and it is intended in the appended claims to cover all such changes and modifications as fall within the true spirit and scope of the invention.

The embodiments of the invention in which an exclusive property or privilege is claimed are defined as follows:

1. An article carrier comprising a generally flat base having an integral rim portion, an upright handle secured to said base, said base and handle being of durable material and constituting load bearing structure for supporting the weight of articles in the carrier, and vertically disposed wall structure of renewable material and having parts thereof disposed in general coincidence to the outer edge of said base and inside said rim portion and constituting article retaining means for securing articles in the carrier against transverse movement in any direction relative to said load bearing structure, said load bearing structure and said article retaining means being disjointably related with each other whereby said article retaining means may be removed from said load bearing structure.

2. Renewable article retaining means for an article carrier having a durable load bearing structure, said retaining means comprising spaced side and end walls in end to end relation; and a medial partition connected at its ends to said end walls medially thereof, a positioning notch formed in each end wall and directly below the adjacent end of said medial partition for interrelating said end walls with the load bearing structure, and at least one positioning notch on the bottom edge of each side wall for interrelating said side walls with said load bearing structure.

3. An article carrier comprising a base having at least one transverse bracing strut arranged to impart reinforcement to said base and to divide the base into article receiving cells and having an upwardly extending protrusion formed at each end of said strut, a handle secured to said base, spaced side and end walls of renewable material interconnected to each other and disposed in general coincidence with the outer edge of said base, the outer edges of said protrusions being outwardly and downwardly inclined to guide the bottom edges of said side and end walls into proper coincidence with the outer edges of said base during formation of the carrier, and a multi-panelled medial partition of renewable material interconnected at its ends with said end walls medially thereof, portions of the panels of said partition being in face contacting relation to define a cavity for removably receiving at least a part of said handle.

4. A carrier according to claim 3 wherein slots are formed along the bottom edges of said side walls for receiving the end portions of said strut thereby to aid in aligning said side walls and the outer edges of said base.

5. A carrier according to claim 3 wherein said base is provided with integral side and end wall rim portions disposed in general coincidence with the bottom edges of said side and end walls.

6. An article carrier comprising a base, a handle secured to said base, spaced side and end walls of renewable material interconnected to each other and disposed in general coincidence with the outer edge of said base, a multi-panelled medial partition of renewable material interconnected at its ends with said end walls medially thereof, portions of the panels of said partition being in face contacting relation to define a cavity for removably receiving at least a part of said handle, coincidental hand gripping apertures formed in said handle and in said multi-panelled partition, and a securing flap struck out of at least one panel of said multi-panelled partition and foldably joined thereto, said flap being foldable through said gripping aperture in said handle to aid in holding said handle and partition together in a generally fixed but removable relation to each other.

7. An article carrier comprising a base, a handle secured to said base, spaced side and end walls of renewable material interconnected to each other and disposed in general coincidence with the outer edge of said base, a multi-panelled medial partition of renewable material interconnected at its ends with said end walls medially thereof, portions of the panels of said partition being in face contacting relation to define a cavity for removably receiving at least a part of said handle and said multi-panelled partition at its top edge being provided with an opening through which a part of said handle protrudes upwardly, and an abutment ledge formed on said handle for engaging an edge of at least one panel of said multi-panelled partition thereby to aid in preventing upward movement of said multi-panelled partition relative to said handle, said ledge being spaced above said base by a distance corresponding to the spacing between said edge of said panel and the bottoms of said side and end walls.

8. A carrier according to claim 7 wherein said abutment ledge overlies the topmost edge of said multi-panelled partition.

9. An article carrier comprising a generally flat base, an upright handle secured to said base, said base and handle being of durable material and constituting load bearing structure for supporting the weight of the articles in the carrier, and wall structure of renewable material and having parts thereof disposed in general coincidence to the outer edge of said base and constituting article retaining means for securing articles in the carrier against transverse movement in any direction relative to said load bearing structure, said load bearing structure and said article retaining means being disjointably related with each other whereby said article retaining means may be removed from said load bearing structure, said handle being disjointably connected to said base by a plurality of downwardly converging semi-rigid fingers formed in said base and disposed to define a plurality of sockets which cooperate with a plurality of prongs formed on said handle each having a rounded nose portion and a fastening ledge for cooperating with the fingers of each socket respectively.

10. A carirer according to claim 9 wherein a tab is formed on the outer surface of at least some of said fingers for engagement by a releasing element for prying said fingers outwardly thereby to release the associated prong.

References Cited

UNITED STATES PATENTS

| | | | |
|---|---|---|---|
| 2,431,713 | 12/1947 | Stigler | 220—104 |
| 2,461,879 | 2/1949 | Crane | 220—118 |
| 2,510,591 | 6/1950 | Listman | 220—110 |
| 2,535,114 | 12/1950 | Acton | 220—116 |
| 2,609,137 | 9/1952 | Toensmeier | 220—105 |
| 2,675,157 | 4/1954 | Turner | 220—105 |

DONALD F. NORTON, *Primary Examiner.*